Sept. 12, 1967     R. B. HODGDON, JR., ET AL     3,341,366
SULFONATED POLYMERS OF $\alpha,\beta,\beta$-TRIFLUOROSTYRENE, WITH
APPLICATIONS TO STRUCTURES AND CELLS
Filed March 30, 1965
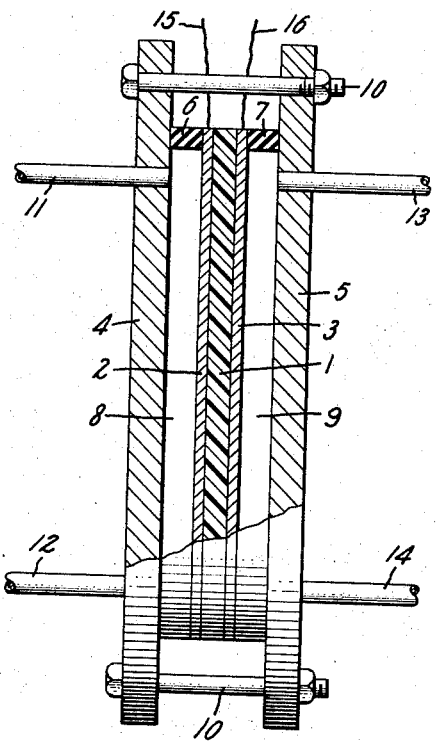
Inventors:
Russell B. Hodgdon, Jr.
John F. Enos,
Edwin J. Aiken,
by Paul A. Frank
Their Attorney.

_United States Patent Office_

3,341,366
Patented Sept. 12, 1967

3,341,366
SULFONATED POLYMERS OF α,β,β-TRIFLUORO-
STYRENE, WITH APPLICATIONS TO STRUC-
TURES AND CELLS
Russell Bates Hodgdon, Jr., Hamilton, John Francis Enos,
West Peabody, and Edwin Joseph Aiken, Magnolia,
Mass., assignors to General Electric Company, a corpo-
ration of New York
Filed Mar. 30, 1965, Ser. No. 444,010
28 Claims. (Cl. 136—86)

This invention relates to sulfonated polymers of α,β,β-trifluorostyrene alone or physically blended with inorganic fillers or vinyl polymers, to ion exchange structures formed of such polymers, and to a process of forming a sulfonated polymer of α,β,β-trifluorostyrene. This application is a continuation-in-part of application Ser. No. 390,753, filed Aug. 19, 1964 and now abandoned.

For use in a fuel cell or an electrodialysis cell, it is essential that ion exchange materials be available in the form of a continuous structure, or membrane, as opposed to beads, the form in which ion exchange materials were originally readily available. More recently, ion exchange materials have been produced in the form of membranes, rods, tubes, vessels, and other objects having shapes significantly different from beads. Despite intensive investigation, however, no continuous ion exchange structure has been heretofore developed completely suited in both ion exchange and physical properties to the stringent operating requirements of such cells.

A major disadvantage in the use of ion exchange membranes, particularly in fuel cells, has been the degradation of the ion exchange polymers at or near the oxidation electrode of the cell. This oxidation limits the life of the ion exchange membranes. Previous attempts to minimize membrane degradation have been through the use of anti-oxidants or by increasing the cross-link density of the ion exchange polymer. However, cross-linking typically produces brittleness, thereby complicating membrane fabrication and handling, while anti-oxidants are consumed during membrane use, and thus are useful only for limited periods.

Another disadvantage encountered in using conventional ion exchange membranes has been the high ionic resistivity. It has heretofore been necessary to severely limit the number of ion exchange substituents present in a polymer in order to reduce water ingestion into the ion exchange structure, since water ingestion produces swelling and destroys the dimensional stability of the ion exchange structure.

It has been attempted to overcome the disadvantages of conventional ion exchange polymers in regard to oxidative, thermal, and dimensional limitations by blending such polymers with inert polymers, such as fluorinated polymers. While such blends offer distinct advantages over unblended ion exchange polymers, the incorporation of an inert polymer does not alter the chemical and thermal properties of the ion exchange polymer itself. Further, the use of inert polymers in substantial proportions will, through displacement of ion exchange polymer, increase the ionic resistance of the continuous ion exchange structure formed by the blend.

It is our discovery that by sulfonating polymerized α,β,β-trifluorostyrene an ion exchange polymer is produced of improved ion exchange and physical properties. The high stability of the fluorine atoms attached to the alkyl carbon atoms imparts oxidative and thermal stability superior to that exhibited by conventional ion exchange polymers such as polystyrene sulfonic acid, for example. An additional advantage accruing to the linear form of the polymer is the higher material density which allows fewer ionic groups for an equivalent conductivity and, as a corollary, reduced swelling of the linear polymer on hydration.

It is our further discovery that by controlling the sulfonation of polymerized α,β,β-trifluorostyrene a cross-linked ion exchange polymer may be obtained. By employing a cross-linked, sulfonated polymer of α,β,β-trifluorostyrene, we achieve not only the advantages of greater oxidative stability and higher temperature tolerance attributable to the high fluorine content and exhibited by the corresponding linear polymer but we also obtain certain additional advantages. The use of a cross-linked structure greatly improves the dimensional stability. Consequently, it is not necessary to limit the proportion of ion exchange groups attached to the polymer in order to control water ingestion and swelling. This in turn means that the resistivity of the continuous ion exchange structure can be greatly reduced. Alternately, since a higher proportion of ion exchange groups may be employed, a much higher proportion of inert ingredients may be incorporated in the continuous ion exchange structure without increasing its resistivity beyond an acceptable level. This imparts a cost advantage to the cross-linked form of the polymer over the linear form. Finally, the advantages of continuous ion exchange structures formed of our cross-linked polymer are not offset by brittleness or loss of fabricability, as might be expected from experience with other types of cross-linked ion exchange structures. On the contrary, the cross-linked, sulfonated polymer may be used to form continuous ion exchange structures possessing even greater flexibility than those which can be obtained with the corresponding linear polymer.

It is an object of our invention to provide a flexible ion exchange polymer of improved oxidative, thermal, and dimensional stability and of increased ionic conductivity as well as a process for its preparation.

It is a second object to provide a linear ion exchange polymer of higher density than previously known linear ion exchange polymers.

It is a third object to provide a cross-linked ion exchange polymer that may be formed into more flexible ion exchange structures than previously known cross-linked ion exchange polymers.

It is another object to provide a continuous ion exchange structure which is flexible, of improved oxidative, thermal, and dimensional stability, and of increased ionic conductivity.

It is a further object to provide an ion exchange structure containing a higher proportion of inert ingredients than conventional ion exchange structures while exhibiting an equivalent ionic conductivity.

It is a still further object to provide a fuel cell construction allowing wider variation in operating conditions and longer cell life.

These and other objects of our invention may be better understood by reference to the detailed description of the invention and the drawing, which is a vertical elevation, partly in section, of a fuel cell.

As employed in this specification, the terms α,β,β-trifluorostyrene and perfluorostyrene are synonymous and refer to the chemical compound designated by the following structure:

Such structure is also referred to in the literature by various additional systematic names, such as α,β,β-trifluoroethylbenzene, phenyl trifluoroethylene, etc. As hereinafter employed, the terms "sulfonated polymer" and "ion exchange polymer" refer to sulfonated polymers of α,β,β-trifluorostyrene. The term "inert" is used to designate ingredients substantially devoid of ion exchange properties. The term "vinyl polymer" refers to polymers formed from monomers containing vinylic unsaturation and polymerized by reaction at the site of such unsaturation.

Perfluorostyrene is disclosed and claimed by Cohen in U.S. Patent 2,612,528. Processes of polymerizing perfluorostyrene are well understood as evidenced by U.S. Patents 2,651,627 and 2,752,400 to Prober. An improved process of polymerizing perfluorostyrene is also disclosed in applicants' previously filed application, Ser. No. 390,-753, noted above. Any polymer of perfluorostyrene having a molecular weight measured by the solvent viscosity method ranging from a lower limit of 10,000 to the highest attainable molecular weight, approximately 300,000, may be utilized in the practice of the invention. It is generally preferred to employ a polymer having a molecular weight, measured by the solvent viscosity method, of from 100,000 to 150,000.

The sulfonation of the polymer is carried out in a solvent solution. The solvent can be selected from the class consisting of chlorinated aliphatic compounds, preferably chlorinated alkyl compounds, such as dichloroethylene, perchloroethylene, chloroform, etc. The perfluorostyrene polymer is contained in a concentration of from 0.10 to 0.30 mole per liter of solvent and must be completely dissolved in the solvent before sulfonation is begun.

The sulfonating agent can be any of those normally used for sulfonating, such as chlorosulfonic acid, concentrated sulfuric acid, oleum, etc. No catalyst is necessary to this reaction. The sulfonating agent is added to the solution swiftly, but dropwise. A minimum sulfonating agent concentration of 0.14 molecule per polymer phenyl group, preferably 0.20 molecule per phenyl group, is required to yield an acceptable level of sulfonation and at least two molecules of sulfonating agent per polymer phenyl group is necessary to achieve a cross-linked ion exchange polymer. Since the reaction of perfluorostyrene polymer with the sulfonating agent tends to be sluggish, it is generally preferred that an excess of sulfonating agent be present with a maximum concentration no higher than 3.00 gram-moles per liter of solution. The reaction is run within a temperature range of from 15° C.±5° C. up to the boiling temperature of the solvent. In the case of chloroform, for example, this is approximately 60° C. A period of at least 10 minutes is required in order to sulfonate the polymer and it may be preferred to allow a period of 3 to 4 hours or longer in order to insure complete reaction.

Sulfonation of the polymer of perfluorostyrene by the process just described results in sulfonic acid groups which are substituted meta to the alkyl moiety. The unexpectedness of the substitution position is illustrated by the fact that polystyrene is sulfonated para to the alkyl moiety. Substitution in the meta position is distinctly advantageous since meta substituents are inactivators of the aromatic nucleus and more difficult to displace than corresponding para substituents.

The resultant sulfonated polymer is believed to be comprised of repeating groups such as unsulfonated units (A), sulfonated units (B), and/or cross-linking units (C):

(A) 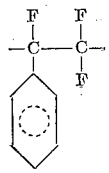

(B) 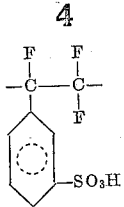

(C) 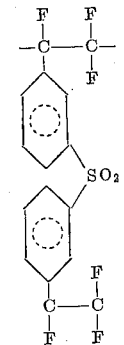

The proportion of sulfonated units (B) present in the sulfonated polymer is determinable by reference to the polymer's ion exchange capacity. The term "ion exchange capacity" is quantitatively defined by the formula (D) $$IEC_A = \frac{H^+}{A}$$

where $IEC_A$ = the ion exchange capacity,
$H^+$ = the milliequivalents of hydrogen ions present, and
$A$ = the weight of dry ion exchange polymer in grams.

Using the sulfonating process described above, a polymer may be formed having an ion exchange capacity of from 0.50 to 4.10.

When a linear polymer is formed, that is, when the concentration of sulfonating agent is maintained at 0.70 mole per liter or less, the degree of sulfonation is controlled so that the ion exchange capacity of the linear polymer does not exceed 1.8. Control of the ion exchange capacity prevents water ingestion and loss of dimensional stability that would occur with higher ion exchange capacity. The linear polymer is made up entirely of repeating units such as (A) and (B).

At a sulfonating agent concentration of 0.80 mole per liter or higher a substantial number of repeating units such as (C) are introduced into the polymer. The presence of cross-linking units (C) in the final polymer is evidenced by the infusibility and water insolubility of the polymer, a characteristic that distinguishes linear polymers from cross-linked polymers. When the cross-linked polymer approaches an ion exchange capacity of 4.10, the highest obtainable, unsulfonated units such as (A) are substantially absent from the polymer.

The molecular weight of the linear form of the ion exchange polymer ranges from 13,500 to 400,000 after sulfonation as measured by the solvent viscosity method. As is true of lattice polymers generally, the molecular weight of our cross-linked sulfonated polymer is not determinable and is considered infinite for all practical purposes.

The sulfonated polymer has a higher density than conventional ion exchange polymers. The density ranges from 1.40 to 1.65 g./cc. and in the preferred form is approximately 1.50 g./cc., compared to the normal maximum ion exchange polymer densities of about 1.10 to 1.25 g./cc. Additionally, the linear sulfonated perfluorostyrene polymer has an extremely high glass transition temperature, in the range of from 175° C. to 200° C. The importance of such a high glass transition temperature is illustrated by the fact that fuel cells employing the linear sulfonated polymer can be run at temperatures up to 99° C., whereas fuel cells employing conventional ion exchange polymers are completely inoperable at 80° C. It is further noted that the limitation of 99° C. on fuel cell operation is not a limitation of the linear sulfonated polymer, but is related to steaming within the cell.

Sulfonated polymers of $\alpha,\beta,\beta$-trifluorostyrene formed in accordance with our invention may be used as the only solid or in combination with inert solids to form continuous ion exchange structures. Such continuous ion exchange structures may exhibit an equivalent ion exchange capacity of from 0.5 to 4.10. When the linear form of the sulfonated perfluorostyrene is employed, the maximum equivalent ion exchange capacity is limited to 1.8 while it is generally preferred to utilize a maximum equivalent ion exchange capacity of 2.7 with the cross-linked sulfonated polymer.

When the ion exchange polymer accounts for the entire weight of the dry structure, the equivalent ion exchange capacity corresponds to that of the ion exchange polymer. When an inert solid ingredient is employed in combination with the ion exchange polymer, the equivalent ion exchange capacity is determined according to the formula (E)
$$IEC_{AB} = IEC_A \times \frac{A}{A+B}$$

where $IEC_{AB}$ = the equivalent ion exchange capacity
$IEC_A$ = the ion exchange capacity of the ion exchange polymer
$A$ = the weight in grams of dry ion exchange polymer
$B$ = the weight in grams of the solid, inert ingredient.

In order to impart mobility to the hydrogen ions and, hence, ionic conductivity to the ion exchange structure, it is necessary that the structure include not only ion exchange polymer but also water. The water content is expressed in weight percent according to the following formula (F)
$$HOH = \frac{W}{W+A+B} \times 100$$

where $HOH$ = water content in percent, by weight
$W$ = weight of water present in grams
$A$ = the weight in grams of dry ion exchange polymer
$B$ = the weight in grams of solid inert ingredient.

The water content may range from as low as 10 percent, preferably 25 percent, by weight, up to 48 percent, by weight. The water content does not include supernatant water but only the water remaining after the ion exchange structure appears dry and feels dry to the touch.

The ion exchange capacity and water content of continuous ion exchange structures together determine the ionic resistivity. A convenient, standard technique of measuring resistivity consists of mounting an ion exchange structure as a resistance element in a bridge. An alternating current of 1 kilocycle per second is passed through the ion exchange structure and the current is balanced in the parallel circuits of the bridge to determine the resistance of the structure. The resistance is converted to resistivity by reference to the geometry and mounting of the ion exchange structure. For example, assuming an ion exchange membrane or part thereof to be mounted in a bridge and attached to terminals separated by a distance $L$ along the length of the membrane, the resistivity in ohm-centimeter is calculated by the formula (G)
$$\rho = \frac{RA}{L}$$

where $\rho$ = resistivity in ohm-centimeter
$R$ = resistance in ohms at 1 kilocycle per second
$A$ = cross-sectional area in square centimeters of the ion exchange membrane, and
$L$ = the distance in centimeters between terminals attached to the ion exchange membrane When membranes formed according to our invention are tested subsequent to saturation with distilled water, the resistivity may range from 20 to 250 ohm-centimeters. By an alternate resistance measuring technique which mounts terminals on opposite faces of an ion exchange membrane but fails to account for membrane thickness as a variable, resistivity may range from 0.2 to 2.00 ohm-cm.$^2$ The above ranges of resistivity refer to hydrogen ion resistivity, i.e, to the resistivity of ion exchange structures including only hydrogen mobile ions. It is appreciated that ion exchange structures in which the mobile hydrogen ions are replaced with potassium ions, as is sometimes practiced for measurement purposes, will exhibit resistivity characteristics differing by a factor of five, reflecting the relatively lower mobility of potassium ions. In the latter case, a resistivity range of 1.00 to 10.00 ohm-cm.$^2$ would be deemed an acceptable operating range.

While sulfonated polymers of perfluorostyrene may be employed as the only solid ingredient of continuous ion exchange structures, it is generally preferred to blend the ion exchange polymer with an inert polymer such as a vinyl polymer. The incorporation of vinyl polymer decreases the cost of continuous ion exchange structures and, in the use of the cross-linked form of the ion exchange polymer, increases the structural strength, resilience, and flexibility of the ion exchange structure. The proportion of vinyl polymer employable is determined by the equivalent ion exchange capacity desired in the ion exchange structure. By reference to (E) above, it is obvious that the proportion of vinyl polymer is automatically determined knowing the equivalent ion exchange capacity desired and the ion exchange capacity of the sulfonated perfluorostyrene. Since the ion exchange capacity of the cross-linked sulfonated perfluorostyrene can range higher than that of the linear sulfonated perfluorostyrene, a greater amount of vinyl polymer may be incorporated into ion exchange structures including the cross-linked form of the ion exchange polymer. With linear vinyl chain polymers capable of elongating over 200 percent without rupture at room temperature (25° C.), it is generally preferred that at least 30 percent, by weight, of the sulfonated polymer be present in the ion exchange structure.

Any solid, vinyl polymer, with or without substituents, may be blended with sulfonated polymers of perfluorostyrene according to our invention. The requirement that the vinyl polymer remain solid at temperatures up to 100° C. determines the minimum molecular weight, which is generally around 10,000. At the opposite extreme, vinyl polymers of the highest known molecular weight levels, that is, up to approximately 5,000,000, may also be used.

A wide variety of solid, vinyl hydrocarbon polymers, both substituted and unsubstituted, are known and commercially available. Solid, vinyl halocarbon polymers, particularly fluorocarbon polymers, are the most preferred blending polymers. Exemplary preferred fluorocarbon polymers suitable to the practice of the invention include polyvinylidene fluoride, copolymers of vinylidene fluoride and chlorotrifluoroethylene, polychlorotrifluoroethylene, copolymers of vinylidene fluoride and hexafluoropropylene, polytetrafluoroethylene, and copolymers of polytetrafluoroethylene and hexafluoropropylene. Exemplary preferred non-fluorinated vinyl polymers include polyalkylene resins such as polyethylene, polypropylene, and polybutylene; substituted polyalkylene polymers such as polyvinyl chloride, polyvinylidene chloride, polyvinyl acetate, polyacrylonitrile, and polyethylene chlorosulfonic acid; and vinyl hydrocarbon chain rubbers such as butadiene, copolymers of styrene and butadiene, isoprene, and neoprene.

Although only certain representative preferred polymer blends are specifically enumerated, it is appreciated that numerous additional homopolymers, interpolymers, and mixed polymers will be readily suggested to those skilled in the art. Generally, such factors as commercial availability, cost, thermal and oxidative stability requirements, type and conditions of use, etc., will be determinative of the exact sulfonated polymer-inert polymer blend selected for a specific application. In situations where low costs are of paramount interest, the use of up to 50 percent, by weight, of the solids content in the form of inert, inorganic fillers such as, for example, clay, carbon, silica, vermiculites, etc., may be practiced.

A preferred procedure of blending sulfonated polymers of perfluorostyrene with inert polymers such as vinyl polymers consists of mechanically milling, kneading, or masticating the polymers in the presence of a plasticizer. The plasticizer aids in working the polymers. The amount may vary from 0 to 500 percent, by weight, of the blend but is preferably in the range of from 0.5 to 20 percent, by weight. Among the plasticizers which may be used are alcohols, phosphate esters, polyethylene glycol, other ethylene glycols, glycerol, ethers, etc. The majority of these materials are water soluble and are thus easily removed from the ion exchange structure during fabrication. A preferred plasticizer is triethylphosphate. When sulfonated polymers of perfluorostyrene are to form the sole polymer present in an ion exchange structure, the blending procedure is still followed in order to distribute the plasticizer within the polymer.

The plasticized ion exchange polymer or ion exchange polymer-inert polymer blend may be fabricated into an ion exchange structure by any number of conventional plastic working techniques, such as molding, calendering, extruding, etc. The preferred procedure of shaping the plasticized polymer is by molding at elevated temperatures and pressures. When triethylphosphate is used in an amount of 5 to 300 percent, by weight, of the polymer, the forming operation is carried out at from 250° F. to 300° F. at a pressure of from 1,000 to 2,000 p.s.i. With varied quantities of triethylphosphate or with other mentioned plasticizers, the temperature and pressure requirements will vary somewhat.

An alternate method of shaping ion exchange structures, particularly membranes, is applicable only to structures formed of linear sulfonated polymers of perfluorostyrene alone and most, but not all, blends of such polymer with inert polymers. To a solvent is added from 15 to 25 percent, by weight, based on the weight of solvent, of the linear sulfonated polymer or linear sulfonated polymer-inert polymer blend. The solution is poured on a casting table having a variable pitch doctor blade, or similar casting apparatus, and the solvent is allowed to evaporate at room temperature to leave a polymer membrane. When blended polymers are desired, a solvent must be chosen which is a solvent both for the ion exchange polymer and inert polymer. The casting process is, of course, inapplicable to the cross-linked sulfonated polymer, since it is insoluble in known solvents.

After being fabricated into the desired structural configuration, the ion exchange structure is prepared for use by rinsing and soaking in water to remove solvent or plasticizer impurities and to ingest water to impart ionic conductivity. A wide variety of soaking and rinsing techniques may be employed. The quantity and frequency of replenishment of water used as well as the duration of water contact with the ion exchange structure will depend on the water content and absence of plasticizer or solvent impurities desired. In fuel cell applications, after several initial rinsings to remove gross impurities, at least two soakings of over 5 hours' duration are preferred.

When the continuous ion exchange structures formed according to our invention take the form of membranes for use in fuel cells, the polymer may be optionally formed around an inert, felted, woven, matted, foraminous, or otherwise perforate reinforcing structure, as is well known in the art. The thickness of the membranes employed in the practice of the present invention are not critical and may vary from a mil up to a quarter of an inch or more. However, for economic reasons, the membranes are preferably as thin as possible, such as for example, from about 1 to 25 mils. The surface dimensions of the membrane may be chosen to fit the fuel cell in which it is to be used.

The membranes formed according to our invention may be employed in fuel cells in combination with conventional electrodes. Suitable electrodes are disclosed in commonly assigned application Ser. No. 108,418, filed May 9, 1961, now Patent 3,097,484, and in Grubb Patent 2,913,511. In general, any corrosion-resistant electrocatalytic electrode, regardless of configuration, may be used with ion exchange structures of our invention. Electrodes are attached to our membranes at a temperature of from 250° F. to 280° F. and a pressure of 450 to 800 p.s.i. (Heiss gage reading). If desired, bonding may be facilitated by partially plasticizing the membrane surface, as for example, with 10 percent, by weight, triethylphosphate.

A specific fuel cell configuration is shown in the drawing. An ion exchange membrane 1 formed according to our invention is mounted between electrodes 2 and 3. The membrane and electrodes together form a membrane-electrode assembly. Fixtures 4 and 5, separated from electrodes 2 and 3, respectively, by insulating shims 6 and 7 form reactant chambers 8 and 9 adjacent the electrodes. The fixtures, shims, and membrane-electrode assembly are held together by tie bold assemblies 10. Conduits 11 and 12 in fixture 4 and conduits 13 and 14 in fixture 5 allow ingress and egress of fluent reactants and products to and from the fuel cell. Electrical energy may be removed from the fuel cell through electrical leads 15 and 16 attached to electrodes 2 and 3, respectively.

The following examples are for purposes of illustration and are not intended to limit the invention.

*Example 1*

Ten grams (0.106 mole/liter) of poly $\alpha,\beta,\beta$-trifluorostyrene (M.W.=126,000) was added to 600 ml. of reagent grade chloroform contained in a 2 liter 3-neck glass resin kettle equipped with a "Teflon" stirrer, addition funnel, heating mantle, and reflux condenser, and stirred until total solution was obtained.

Exactly 1.5 g. of chlorosulfonic acid (0.021) mole/liter and 0.2 molecule per polymer phenyl group) contained in 10 ml. of CHCl$_3$ was added to the addition funnel. The solution was heated to reflux (60° C.) and the contents of the addition funnel added quickly to the reaction mixture and the total content heated at reflux for three hours followed by a cooling to 27° C. At this point, a gelatinous precipitate appeared in the reaction mixture which settled at the bottom of the kettle.

The tan chloroform solution was decanted away from the precipitate, and the latter taken up in 200 ml. of methyl alcohol. The solution of crude poly $\alpha,\beta,\beta$-trifluorostyrene sulfonic acid was boiled in its methanol solution for one hour and then placed in glass and "Mylar" (trademark for polyethylene terephthalate) trays overnight to effect evaporation of the solvent.

Crude dry poly $\alpha,\beta,\beta$-trifluorostyrene sulfonic acid was scraped from trays and washed with distilled water until a continuous wash bath was found to be free of chloride and sulfate ions. The polymer was dried overnight at 50° C. and then ball-milled to a fine tan powder.

The ion exchange capacity of the polymer product was found to be 1.23 meq. H$^+$/g. dry resin. The solubility at room temperature (27° C.) in various solvents is shown in Table I.

*Example 2*

The same procedure was used as in Example 1, except that 3.5 g. of chlorosulfonic acid (0.048 m./l. and 0.45 m./phenyl group) was added. The material obtained possessed an ion exchange capacity of 1.99 meq./g. of dry polymer. Sulfonated poly $\alpha,\beta,\beta$-trifluorostyrene was soluble in the same solvents as described in Example 1.

Example 3

The same procedure was used as in Example 1, except that 400 ml. CHCl$_3$ was used instead of 600 ml. The material obtained possessed an ion exchange capacity of 1.28 meq. H$^+$/g. dry resin. Sulfonated poly $\alpha,\beta,\beta$-trifluorostyrene was soluble in the same solvents as described in Example 1.

Example 4

The same procedure was used as in Example 1, except that 6.7 g. of chlorosulfonic acid was used in the reaction (0.096 m./l. and 0.93 molecule per phenyl group). The material obtained was water soluble and had to be dialyzed for one week in a collodian bag in order to separate sulfuric and hydrochloric acids from the polymeric sulfonic acid. The ion exchange capacity of the resin obtained was 4.07 meq. H$^+$/g. dry resin. This material was soluble only in water, acetic acid, methyl alcohol, ethyl alcohol, and acetone. It was insoluble in all other organic solvents.

Example 5

The same procedure was used as in Example 1, except that poly $\alpha,\beta,\beta$-trifluorostyrene having a molecular weight of 42,500 was used. The ion exchange capacity of the resin prepared was 1.19 meq. H$^+$/g. dry resin. Resin had some solubility in various solvents as that prepared in Example 1.

Example 6

The same procedure was used as in Example 1, except that poly $\alpha,\beta,\beta$-perfluorostyrene having a molecular weight of 185,000 was used. The ion exchange capacity of the resin prepared was 1.26 meq. H$^+$/g. dry resin. Resin had some solubility in various solvents as that prepared in Example 1.

Example 7

The same procedure was used as in Example 1, except that a temperature of 50° C. was used. The ion exchange capacity of the resin prepared was 0.95 meq. H$^+$/g. dry resin.

Example 8

The same procedure was used as in Example 1, except that a reaction time of only 30 minutes was employed. The ion exchange capacity of the finished resin was 1.19 meq. H$^+$/g. dry resin.

Example 9

The same procedure was used as in Example 1, except that 10 g. of 20 percent oleum was used in place of chlorosulfonic acid. The resin had an ion exchange capacity of 0.87 meq. H$^+$/g. dry resin.

Example 10

Exactly 10 g. (0.105 m./l.) of poly $\alpha,\beta,\beta$-trifluorostyrene (M.W.=126,000) was dissolved in 550 ml. of reagent grade chloroform contained in a two liter resin kettle equipped with a "Teflon" stirrer, addition funnel, water bath heater, and reflux condenser. To the addition funnel were added 60 g. (0.86 m./l. and 8.2 molecules per phenyl group) of chlorosulfonic acid in 50 ml. CHCl$_3$. The external water bath was brought to a temperature of 30° C. and the chlorosulfonic acid solution added over a 10-minute period to the rapidly stirred reaction mixture. The coloration of the reaction solution turned a brown-red color after 5 minutes addition time and a large ball of precipitate occurred around the stirrer at the eight-minute mark. The reaction mixture was stirred for 4 hours after final addition of chlorosulfonic acid. The stirrer was removed from the resin kettle and the brown polymer cut from the stirrer blade and placed in a 4 liter beaker containing 1 liter of methyl alcohol. Raw polymer was heated in methanol for two hours whence the brown color of the solid changed to a light tan. It was not soluble in methanol. The resin was cut up and washed in distilled water until free of chloride and sulfate ion, then dried overnight at 50° C. and ball-milled to a fine tan powder. The ion exchange capacity was found to be 2.05 meq. H$^+$/g. dry resin. The partially sulfonated poly $\alpha,\beta,\beta$-trifluorostyrene sulfonic acid was found to be insoluble in both common and uncommon organic solvents. It was also insoluble, but swellable, in water. There can be no question but that this polymer is cross-linked.

Example 11

The same reaction was carried out as that described in Example 10, except that 100 g. of chlorosulfonic acid was used instead of 50 g. The ion exchange capacity of the final cross-linked poly $\alpha,\beta,\beta$-trifluorostyrene sulfonic acid was 2.11 meq. H$^+$/g. dry resin. The resin was insoluble in common and uncommon organic solvents but was water swellable.

Example 12

The same reaction was run as that described in Example 10, except that 70 g. of chlorosulfonic acid was used and that the reaction temperature was changed to 35° C. The ion exchange capacity of the polymer was found to be 2.24 meq. H$^+$/g. dry resin. Again this resin showed solvent insolubility but was swollen by water.

Example 13

The same reaction was run as that described in Example 12, except that the reaction temperature was changed to 40° C. The ion exchange capacity of the polymer was found to be 2.46 meq. H$^+$/g. dry resin. Again the resin showed insolubility to solvents but was swollen by water.

Example 14

The same reaction was run as that described in Example 12, except that the reaction temperature was changed to 50° C. The ion exchange capacity of the polymer was found to be 2.92 meq. H$^+$/g. dry resin. Again, this resin showed insolubility to solvents but was swollen by water.

Example 15

The same reaction was run as that described in Example 12, except that the reaction temperature was changed to 60° C. The ion exchange capacity of the polymer was found to be 3.85 meq. H$^+$/g. dry resin. Again, the resin was found to be insoluble to solvents but was swollen to a very high degree by water.

Example 16

The same reaction was run as that described in Example 10, except that the reaction time was cut to 1 hour. The ion exchange capacity of the polymer was found to be 2.04 meq. H$^+$/g. dry resin. The resin was insoluble in common and uncommon organic solvents, but was swollen by water.

Example 17

The same reaction was run as that described in Example 10, except that the reaction time was advanced to 12 hours. The ion exchange capacity of the polymer was found to be 2.15 meq. H$^+$/g. dry resin. The resin was insoluble in common and uncommon organic solvents, but was swollen by water. This indicated the material to be cross-linked.

Example 18

The same reaction was run as that of Example 10, except that only 450 ml. of chloroform was used for a reaction solvent rather than 600 ml. This corresponds to 0.14 mole per liter of poly $\alpha,\beta,\beta$-trifluorostyrene and 1.14 moles per liter of chlorosulfonic acid. The ion exchange capacity of the resin was found to be 2.28 meq. H$^+$/g. dry resin. Again, the resin was water swellable but insoluble in common and uncommon organic solvents.

Example 19

The same reaction was run as that of Example 12, except that 900 ml. of chloroform was used for the reaction solvent rather than 600 ml. This corresponds to 0.07 mole per liter of poly $\alpha,\beta,\beta$-trifluorostyrene and 0.58 mole per liter of chlorosulfonic acid (8.2 molecules per phenyl group). The ion exchange capacity of the resin was found to be 1.91 meq. $H^+$/g. dry resin. Again, the resin was water swellable but insoluble in all common and uncommon organic solvents tested.

The test results of Examples 1–19 inclusive are summarized in Table I.

TABLE I

| Example No. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Molecular Weight of Polymer: | | | | | | | | | | | | | | | | | | | |
| 42,500 | | | | | X | | | | | | | | | | | | | | |
| 126,000 | X | X | X | X | | X | X | X | X | X | X | X | X | X | X | X | X | X | X |
| 185,000 | | | | | | X | | | | | | | | | | | | | |
| Sulfonating Agent Conc., M/L of solution | .021 | .048 | .033 | .096 | .021 | .021 | .021 | .021 | .040 | .86 | 1.43 | 1.00 | 1.00 | 1.00 | 1.00 | .85 | .85 | 1.14 | .58 |
| Mol/Phenyl Group | .2 | .45 | .2 | .93 | .2 | .2 | .2 | .2 | .25 | 8.2 | 14.1 | 9.8 | 9.8 | 9.8 | 9.8 | 8.2 | 8.2 | 11.1 | 8.2 |
| Reaction Time, Hrs | 3 | 3 | 3 | 3 | 3 | 3 | 3 | .5 | 3 | 4 | 4 | 4 | 4 | 4 | 4 | 1 | 12 | 4 | 4 |
| Temperature, °C | 60 | 60 | 60 | 60 | 60 | 60 | 50 | 60 | 60 | 30 | 30 | 35 | 40 | 50 | 60 | 30 | 30 | 30 | 30 |
| Ion Exchange Capacity | 1.23 | 1.99 | 1.28 | 4.07 | 1.19 | 1.26 | 0.95 | 1.19 | 0.87 | 2.05 | 2.11 | 2.24 | 2.46 | 2.92 | 3.85 | 2.04 | 2.15 | 2.28 | 1.91 |
| Soluble in: | | | | | | | | | | | | | | | | | | | |
| Methanol | Yes | Yes | Yes | Yes | Yes | Yes | Yes | Yes | Yes | No | No | No | No | No | No | No | No | No | No |
| Ethanol | Yes | Yes | Yes | Yes | Yes | Yes | Yes | Yes | Yes | No | No | No | No | No | No | No | No | No | No |
| Isopropanol | Yes | Yes | Yes | No | Yes | Yes | Yes | Yes | Yes | No | No | No | No | No | No | No | No | No | No |
| Butanol | Yes | Yes | Yes | Yes | Yes | Yes | Yes | Yes | Yes | No | No | No | No | No | No | No | No | No | No |
| Acetone | Yes | Yes | Yes | No | Yes | Yes | Yes | Yes | Yes | No | No | No | No | No | No | No | No | No | No |
| Formamide | Yes | Yes | Yes | Yes | Yes | Yes | Yes | Yes | Yes | No | No | No | No | No | No | No | No | No | No |
| Dimethyl formamide | Yes | Yes | Yes | No | Yes | Yes | Yes | Yes | Yes | No | No | No | No | No | No | No | No | No | No |
| Dioxane | Yes | Yes | Yes | No | Yes | Yes | Yes | Yes | Yes | No | No | No | No | No | No | No | No | No | No |
| Benzene | No | No | No | No | No | No | No | No | No | No | No | No | No | No | No | No | No | No | No |
| Chloroform | No | No | No | No | No | No | No | No | No | No | No | No | No | No | No | No | No | No | No |
| Hexane | No | No | No | No | No | No | No | No | No | No | No | No | No | No | No | No | No | No | No |
| Water | *No | *No | *No | Yes | *No | *No | *No | *No | *No | *No | *No | *No | *No | *No | *No | *No | *No | *No | *No |

* Insoluble in water but swelled thereby, indicating water ingestion.

Example 20

Ten grams of linear, sulfonated poly $\alpha,\beta,\beta$-trifluorostyrene (ion exchange capacity=1.80; M.W. 103,000) was dissolved in 50 g. acetone at 45° C. over a two hour period on a steam bath. A 250 ml. beaker was used. In a separate 250 ml. beaker, exactly 10 g. of "Kynar" (a trademark for polyvinylidene fluoride of about 200,000 M.W.) was dissolved in 50 g. acetone at 45° C. on a steam bath. When both vessels showed complete solubility, they were combined and made up to 120 g. total weight by the addition of cold acetone. The resulting mix was spread on a "Mylar" sheet laid on a casting table using a doctor blade having a 15 mil clearance. The acetone was allowed to dry very slowly and when the "Mylar" sheet began to contract due to volume of resin-acetone reduction, water was squirted on the forming membrane by use of an atomizer. While still moist, the acetone-free membrane was removed from the "Mylar" and immersed in distilled water. It was clear and homogeneous. The equivalent ion exchange capacity was 0.88 meq. $H^+$/g. dry resin. Its resistivity (fully hydrated) was 3.01 ohm-cm.$^2$ in the potassium salt form. (After 10 minutes equilibration with 0.6 N KCl.)

Example 21

The same operation was carried out as in Example 20, except that 10 g. of "Viton A–HV" (a trademark for 1:1 copolymer of vinylidene fluoride and hexafluoropropylene) was used as inert polyfluorocarbon polymer. The equivalent ion exchange capacity was 0.90 meq. $H^+$/g. dry resin. Its resistivity (fully hydrated) was 3.49 ohm-cm.$^2$ in the potassium salt form.

Example 22

The same operation was carried out as in Example 20, except that the polyvinylidene fluoride was doubled to 20 g. The ion exchange capacity was 0.60 meq. $H^+$/g. dry resin. Its resistivity (fully hydrated) was 6.87 ohm-cm.$^2$ in the potassium salt form.

Example 23

The same operation was carried out as in Example 21, except that the "Viton A–HV" was doubled to 20 g. The ion exchange capacity was 0.60 meq. $H^+$/g. dry resin. Its resistivity (fully hydrated) was 5.54 ohm-cm.$^2$ in the potassium salt form.

Example 24

The same operation was carried out as in Example 20, except that the proportion of ion exchange polymer was doubled to 20 g. The ion exchange capacity was 1.20 meq. $H^+$/g. dry resin. Its resistivity (fully hydrated) was 2.69 ohm-cm.$^2$ in the potassium salt form.

Example 25

The same operation was carried out as in Example 21, except that the proportion of ion exchange polymer was doubled to 20 g. The ion exchange capacity was 1.20 meq. $H^+$/g. dry resin. Its resistivity (fully hydrated) was 3.33 ohm-cm.$^2$ in the potassium salt form.

Example 26

The same operation was carried out as in Example 20, except that polyvinyl chloride replaced polyvinylidene fluoride and the solvent used is a 1:1 tetrahydrofuran acetone mixture in place of pure acetone. The film was clear and very compatible. The ion exchange capacity was 0.90 meq. $H^+$/g. dry resin. Its resistivity (fully hydrated) was 3.77 ohm-cm.$^2$ in the potassium salt form.

Example 27

The same operation was carried out as in Example 26, except that polyvinyl chloride was tripled to 30 g. Its ion exchange capacity is 0.45 meq. $H^+$/g. dry resin. Its resistivity (fully hydrated) is 6.97 ohm-cm.$^2$ in the potassium ion form.

Example 28

A small tube was filled to about half its capacity (2 g.) with low density polyethylene and melted to a waxy liquid by intermittent waving over the low flame of a Meeker burner. While hot, 2 g. of 1.80 ion exchange capacity linear poly $\alpha,\beta,\beta$-trifluorostyrene sulfonic acid was intermittently added with vigorous stirring. The solution was poured onto a glass plate whence good compatibility was shown. The resistivity of this ion exchange polymer-polyethylene blend was not measured because of adhesion to the glass plate.

Example 29

The same operation was carried out as in Example 20, except that a 20 percent, by weight, solution of polyvinyl acetate in tetrahydrofuran was used in place of polyvinylidene fluoride. Also, the ion exchange polymer was present in a concentration of 20 percent, by weight, in tetrahydrofuran. A white membrane was obtained of insufficient strength for measurement of resistivity. Its ion exchange capacity was 0.90 meq. H+/g. dry resin.

Example 30

Ten grams of milled neoprene rubber and 10 g. of linear poly $\alpha,\beta,\beta$-trifluorostyrene sulfonic acid (ion exchange capacity=1.80, M.W.=103,000) were dissolved in hot tetrahydrofuran to form a mixture. The solids content was adjusted to 12 percent TS, and a film was cast on a "Mylar" sheet on the surface of a film casting table using a doctor blade set at 15 mils clearance. Solvent was allowed to evaporate without extensive hydration until the film showed legginess. The film and its "Mylar" sheet were then separated in a water bath. Its H+ resisttivity was 50 ohm-cm. in the fully hydrated form.

Example 31

The same procedure was followed as that of Example 20, except that the solvents used were dimethyl formamide and the inert polymer was polyacrylonitrile. It took 5 days to dry the film at room temperature. Its ion exchange capacity was 0.90 meq. H+ resistivity was 43 ohm-cm. (fully hydrated).

Example 32

The same procedure was used as that of Example 20, except that tetrahydrofuran was used as solvent, polyvinylidene chloride used as inert polymer, and the casting solution was only 15 percent solids rather than 20 percent. A most compatible film was obtained, with an ion exchange capacity of 0.90. Its average resistivity was 4.20 w-cm.$^2$ in the potassium ion form (fully hydrated).

Example 33

A 0.5 g. of linear poly $\alpha,\beta,\beta$-trifluorostyrene sulfonic acid (ion exchange capacity=1.80, M.W.=103,000) admixed with 0.5 g. of powdered "Teflon FEP" (a trademark for copolymer of tetrafluoroethylene and hexafluoropropylene). The mixture was heated to 165° C. on a Fisher-Johns melting point block. A compatible button was obtained, showing membrane forming feasibility.

The test results of Examples 20–33 inclusive are summarized in part in Table II.

Example 34

Ten grams of linear sulfonated poly $\alpha,\beta,\beta$-trifluorostyrene having an ion exchange capacity of 1.56 was plasticized with 2.5 ml. of an equal part, by weight, mixture of dioxane and triethylphosphate in a laboratory rubber mill. The plasticized resin was molded at 150° C. at 10,000 p.s.i. (Heiss gage) to a 15 mil thickness over a 30-minute period. The formed membrane was placed in distilled water for 16 hours followed by a fresh leaching in distilled water for six hours at 65° C. This ion exchange membrane had the following properties: Water content =29.5 percent by weight; H+ resistivity=26.5 ohm-cm.; ion exchange capacity=1.56.

Example 35

The same procedure was followed as in Example 30, except that 2.5 ml. of pure triethylphosphate was used as plasticizer. This ion exchange membrane had the following properties: Water content=33.0 percent by weight; H+ resistivity=30.0 ohm-cm.; ion exchange capacity=1.56.

Example 36

Ten grams of cross-linked poly $\alpha,\beta,\beta$-trifluorostyrene sulfonic acid having an ion exchange capacity of 1.56 meq. H+/g. dry resin was masticated on a rubber mill along with 6 g. of triethylphosphate for a period of 15 minutes. The crude mix was sandwiched between two pressure plates and molded at 150° C. (400 p.s.i. Heiss gage) for a period of 30 minutes. The molded membrane was leached in cold water (22° C.) for 16 hours followed by a hot water leaching at 65° C. for 8 more hours.

The properties of this ion exchange membrane were found to be as follows: resistivity=25 ohm-cm.; water content=29.5 percent; ion exchange capacity=1.56 meq. H+/g. dry resin.

Niedrach-Alford type electrodes formed of platinum black and 10 percent, by weight, polytetrafluoroethylene wet-proofing agent were placed on each face of the ion exchange membrane. The electrodes were attached to the membrane by placing the membrane-electrode stack in a platen press and applying at pressure of 450 p.s.i. (Heiss gage) at 275° F. The membrane-electrode stack was then a conventional fuel cell fixture, supplied with hydrogen on one side as a fuel and oxygen on the other side as an oxidant, and found to exhibit an electrical potential of 0.800 volt at 50 amps/ft.$^2$ current density.

Example 37

Ten grams of styrene-butadiene copolymer rubber was masticated on a laboratory rubber mill with 10 g. of linear poly $\alpha,\beta,\beta$-trifluorostyrene sulfonic acid (ion exchange capacity=1.80, M.W.=103,000) using 5 ml. of triethylphosphate to give plasticization to the polyelectrolyte. The milled stock was pressed between two "Mylar"

TABLE II

| Example | 20 | 21 | 22 | 23 | 24 | 25 | 26 | 27 | 28 | 29 | 30 | 31 | 32 | 33 |
|---|---|---|---|---|---|---|---|---|---|---|---|---|---|---|
| Equivalent Ion Exchange Capacity | .88 | .90 | .60 | .60 | 1.20 | 1.20 | .90 | .45 | ---- | .90 | ---- | .90 | .90 | ---- |
| Resistivity: | | | | | | | | | | | | | | |
| K+, ohm-cm.$^2$ | 3.01 | 3.49 | 6.87 | 5.54 | 2.69 | 3.33 | 3.77 | 6.97 | ---- | ---- | ---- | ---- | 4.20 | ---- |
| H+, ohm-cm. | ---- | ---- | ---- | ---- | ---- | ---- | ---- | ---- | ---- | ---- | 50 | 43 | ---- | ---- |
| Weight Percentage: | | | | | | | | | | | | | | |
| Ion Exchange Polymer | 50 | 50 | 33 | 33 | 67 | 67 | 50 | 25 | 50 | 50 | 50 | 50 | 50 | 50 |
| Inert Polymer | 50 | 50 | 67 | 67 | 33 | 33 | 50 | 75 | 50 | 50 | 50 | 50 | 50 | 50 |
| Inert Polymer Type: | | | | | | | | | | | | | | |
| "Kynar"* | X | | X | | X | | | | | | | | | |
| "Viton A-HV"* | | X | | X | | X | | | | | | X | | |
| Polyvinyl Chloride | | | | | | | X | X | | | | | | |
| Polyethylene | | | | | | | | | X | | | | | |
| Polyvinyl Acetate | | | | | | | | | | X | | | | |
| Neoprene | | | | | | | | | | | X | | | |
| Polyvinylidene Chloride | | | | | | | | | | | | | X | |
| "Teflon FEP"* | | | | | | | | | | | | | | X |

*Trademarks—generic identification in text of examples.

sheets and two ferroplates at 10,000 p.s.i. (Heiss gage) and 90° C. for a period of 15 minutes. A brown opaque membrane was produced. This membrane was leached in 30° C. distilled water overnight followed by heating in distilled water for two hours at 65° C. to eliminate the triethylphosphate plasticizer.

*Example 38*

Seven and one-half grams of polyvinylidene fluoride and a 1:1 copolymer of vinylidene fluoride and chlorotrifluoroethylene (commercially available under the trademark "Kel–F 3700") were masticated in the mixing head of a small Banbury mixer using 3 ml. of triethylphosphate plasticizer until a gummy and heterogeneous mixture is obtained. Letting a mixing head speed of 50 r.p.m., exactly 10 g. of cross-linked poly $\alpha,\beta,\beta$-trifluorostyrene sulfonic acid (ion exchange capacity=2.40±0.05) and 7 ml. of triethylphosphate were added slowly in small increments so as to maintain a mixing gum. After the final ion exchange polymer-plasticizer addition, the mixing was continued for a period of one hour. The well-mixed blend was removed from the mixing head and rolled on a small laboratory size rubber mill (10 mil setting) to form a sheet. Milling was continued for ten minutes. The sheet was removed from the mill and was pressed within a cavity at 150° C. and 10,000 p.s.i. (Heiss gage) to form a homogeneous sheet. The membrane sheet was extracted with cold distilled water for a period of three hours, then allowed to further exchange triethylphosphate for water in a 65° C. water bath for 8 hours. The membrane was transparent.

*Example 39*

A quantity of 6.67 g. of copolymer of 3 moles of chlorotrifluoroethylene—7 moles of polyvinylidene fluoride was hand mixed with 3.33 g. of cross-linked poly $\alpha,\beta,\beta$-trifluorostyrene sulfonic acid (ion exchange capacity=2.30 ±0.05) and the loose mix charged to the mixing head of a small Banbury mixer. Five ml. of triethylphosphate were added and the blended materials masticated at 100 r.p.m. for a one hour period. The blended polymer and plasticizer was removed and milled on a laboratory rubber mill into sheet form during a ten-minute operation. Rubberized sheet was then molded at slightly below 500 p.s.i. (Heiss gage) and at a temperature of 90–100° C. to form a membrane sheet. The membrane sheet was equilibrated in distilled water at 50° C. for eight hours to yield a plasticizer-free ion exchange membrane.

*Example 40*

A quantity of 13.33 g. of "Hypalon–30" (a trademark for chlorosulfonated polyethylene) was hand mixed with 6.67 g. of sulfonated poly $\alpha,\beta,\beta$-trifluorostyrene of the cross-linked variety having an ion exchange capacity of 2.36 meq. hydrogen ion per gram of dry resin. The dry mix was rubber milled with 5 ml. of triethylphosphate until a sheet was obtained. This sheet was charged to the mixing head of a small Banbury type mixer along with 5 additional ml. of triethylphosphate. The mix was masticated for 1 hour at 100 r.p.m. The blended polymer and plasticizer was removed and remilled on a laboratory size rubber mill into sheet form during a ten-minute operation. The rubberized sheet was molded at slightly less than 500 p.s.i. at a temperature of 20° C. to form a membrane sheet. Sheet was then equilibrated in distilled water at 30° C. for eight hours to yield a plasticizer-free ion exchange membrane.

*Example 41*

The same procedure was used in this example as was used in Example 39, except that the polymer mixture consisted of 70 percent, by weight, "Kel–F–810" (a trademark for polychlorotrifluoroethylene) and blended with 30 percent, by weight, cross-linked poly $\alpha,\beta,\beta$-trifluorostyrene sulfonic acid of 2.28 ion exchange capacity.

*Example 42*

The same procedure was used in this example as was used in Example 39, except that the polymer mixture consisted essentially of 65 percent, by weight, of a copolymer consisting of 8 moles of chlorotrifluoroethylene and 2 moles of vinylidene fluoride, and 35 percent of cross-linked poly $\alpha,\beta,\beta$-trifluorostyrene sulfonic acid of ion exchange capacity 2.36 was blended.

*Example 43*

The same procedure was used in this example as was used in Example 39, except that the polymer mix consisted essentially of 8 g. of a 1:1 copolymer of chlorotrifluoroethylene and vinylidene fluoride with 2 g. of linear poly $\alpha,\beta,\beta$-trifluorostyrene sulfonic acid having an ion exhange capacity equal to 1.74 meq. H+/g. dry resin.

*Example 44*

The same procedure as used in Example 43 was employed except that the polymer mix consisted of 6.5 g. of a 1:1 copolymer of chlorotrifluoroethylene and vinylidene fluoride with 3.5 g. of cross-linked poly $\alpha\beta,\beta$-trifluorostyrene sulfonic acid having an ion exchange capacity of 2.07 meq. H+/g. dry resin.

*Example 45*

The same procedure was employed as in Example 44, except that the quantity of inert copolymer was 7 g. and the quantity of ion exchange polymer was 3 g. of poly $\alpha,\beta,\beta$-trifluorostyrene sulfonic acid having an ion exchange capacity of 2.14 meq. H+/g. dry resin.

*Example 46*

The same procedure was employed as in Example 45, except that the quantity of inert polymer used was 6 g. and the quantity of ion exchange polymer was 4 g.

*Example 47*

The same procedure was employed as in Example 44, except that 6.75 g. of the 1:1 copolymer of chlorotrifluoroethylene and vinylidene fluoride are blended with 3.25 g. of cross-linked poly $\alpha,\beta,\beta$-trifluorostyrene sulfonic acid of an ion exchange capacity equal to 2.28 meq. H+/g. dry resin.

*Example 48*

The same procedure was employed as in Example 47, except that "Viton A–HV" was used as inert polymer.

*Example 49*

The same procedure was used as described in Example 39, except that the following resins were blended: 12.6 g. copolymer of 1:1 chlorotrifluoroethylene and vinylidene fluoride, 1.4 g. polyvinylidene fluoride, and 6.0 g. cross-linked, poly $\alpha,\beta,\beta$-trifluorostyrene sulfonic acid having an ion exchange capacity of 2.39 meq. H+/g. dry resin.

*Example 50*

The same procedure was used as described in Example 38, except that the following resin variations were used: 8 g. of poliyvinylidene fluoride was blended with 2 g. of cross-linked poly $\alpha,\beta,\beta$-trifluorostyrene having an ion exchange capacity of 4.07 meq. H+/g. dry resin.

*Example 51*

The same procedure was used as described in Example 38, except that the following resin variations were used: 7 g. of polyvinylidene fluoride, 3 g. of a copolymer consisting of 3 moles of chlorotrifluoroethylene with 7 moles of vinylidene fluoride, and 10 g. of cross-linked poly $\alpha,\beta,\beta$-trifluorostyrene having an ion exchange capacity of 2.30 meq. H+/g. dry resin.

Example 52

The same procedure was used as described in Example 51, except that the cross-linked ion exchange polymer had an ion exchange capacity of 2.43 meq. H+/g. dry resin.

Example 53

The same procedure was used as described in Example 51, except that the cross-linked ion exchange polymer had an ion exchange capacity of 2.66 meq. H+/g. dry resin.

Example 54

The same procedure was used as described in Example 38, except that the following resin quantities were used: 9.1 g. polyvinylidene fluoride, 3.9 g. of the copolymer of Example 51, and 7.0 g. of cross-linked poly $\alpha,\beta,\beta$-trifluorostyrene sulfonic acid having an ion exchange capacity of 2.64 meq. H+/g. dry resin.

The properties of the membranes formed by the procedure of Examples 37 to 54 inclusive are summarized in Table III.

and "Kel-F 5500," which is a copolymer formed of 30 percent, by weight, vinylidene fluoride and 70 percent, by weight, chlorotrifluoroethylene. The membranes were mounted in fuel cells and tested according to the procedure of Example 55. The percent by weight ion exchange polymer employed, the ion exchange capacity of the ion exchange polymer, the equivalent ion exchange capacity of the membrane formed, the thickness of each membrane, and the potential of each fuel cell at a current density of 50 amp/ft.$^2$ is set out in Table IV.

TABLE IV

| Example | 57 | 58 | 59 | 60 | 61 | 62 |
|---|---|---|---|---|---|---|
| Proportion of Ion Exchange Polymer (weight-percent) | 30 | 33 | 33 | 32.5 | 35 | 40 |
| Ion Exchange Capacity: | | | | | | |
| Ion Exchange Polymer | 2.36 | 2.32 | 2.39 | 2.28 | 2.10 | 2.10 |
| Equivalent | 0.71 | 0.765 | 0.79 | 0.74 | 0.74 | 0.84 |
| Membrane Thickness (inch) | .014 | .014 | .017 | .012 | .011 | .011 |
| Fuel Cell Potential (volts) | 0.81 | 0.84 | 0.82 | 0.77 | 0.79 | 0.84 |

TABLE III

| Example | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|
| Resistivity: H+, ohm-cm | 70.0 | 27.5 | 23.5 | 13.0 | 21.9 | 25.0 | 155 | 36.0 | 45.0 | 36.0 | 31.0 | 36.0 | 27.9 | 28.0 | 42.0 | 30 | 18.5 | 46 |
| Water Content (weight percent) | | 29.0 | 24.3 | 47.5 | 39.5 | 28.0 | 19.6 | 44.0 | 25.5 | 32.8 | 25.6 | 30.2 | 25.0 | 25.2 | 22.5 | 28.5 | 34.6 | 28.5 |
| Ion Exchange Capacity: | | | | | | | | | | | | | | | | | | |
| Ion Exchange Polymer | 1.80 | 2.40 | 2.30 | 2.36 | 2.28 | 2.31 | 1.74 | 2.07 | 2.14 | 2.07 | 2.28 | 2.28 | 2.39 | 4.07 | 2.30 | 2.43 | 2.66 | 2.64 |
| Equivalent | 0.73 | 1.20 | 0.68 | 0.79 | 0.68 | 0.83 | 0.35 | 0.74 | 0.64 | 0.85 | 0.74 | 0.74 | 0.72 | 0.81 | 1.15 | 1.27 | 1.33 | 0.92 |
| Polymer Proportions (weight percent): | | | | | | | | | | | | | | | | | | |
| Ion Exchange Polymer | 50 | 50 | 33 | 33 | 30 | 35 | 20 | 35 | 30 | 40 | 32 | 32 | 30 | 20 | 50 | 50 | 50 | 35 |
| Inert Polymer, Styrene-Butadiene Copolymer | 50 | | | | | | | | | | | | | | | | | |
| "Kynar"* | | 38 | | | | | | | | | | | | | | | | |
| Vinylidene Fluoride-Chlorotrifluoroethylene Copolymer | | | | | | | | | | | | | 7 | 80 | 35 | 35 | 35 | 20 |
| "Kel-F 810"* | | 12 | 67 | | | 65 | 80 | 65 | 70 | 60 | 68 | | 63 | | 15 | 15 | 15 | 45 |
| Chlorosulfonated Polyethylene | | | | | 70 | | | | | | | | | | | | | |
| "Viton A-HV"* | | | | 67 | | | | | | | | 68 | | | | | | |

*Trademark—generic identification in example text.

Example 55

The ion exchange membrane formed by the procedure of Example 38 was placed between the two fuel cell electrodes. The electrodes were formed of 90 percent, by weight, platinum black and 10 percent, by weight, polytetrafluoroethylene wet-proofing agent. The electrodes were provided additionally with a thin exterior coating of the wet-proofing agent. Such electrodes are disclosed in commonly assigned application Ser. No. 232,689, filed Oct. 24, 1962. The electrodes were bonded to the membrane by placing the electrode-membrane assembly in a platen press and subjecting the assembly to a pressure of 450 p.s.i. (Heiss gage) and at temperature of 250° F. Upon removal from the press, the membrane-electrode assembly was mounted in a fuel cell similar in construction to that shown in the drawing. Hydrogen was supplied to one electrode and oxygen to the remaining electrode. The fuel cell exhibited a potential of 0.738 volt at 50 amperes per square foot current density.

Example 56

The ion exchange membrane formed by the procedure of Example 39 was mounted in a fuel cell according to the procedure of Example 55. The fuel cell exhibited a potential of 0.820 volt when operated at a current density of 50 amp/ft.$^2$.

Examples 57–62

Six ion exchange membranes were formed by the procedure of Example 38. The membranes were formed of a cross-linked sulfonated polymer of $\alpha,\beta,\beta$-trifluorostyrene

Examples 63–67

Five ion exchange membranes were formed by the procedure of Example 38. The membranes were formed of a cross-linked sulfonated polymer of perfluorostyrene, "Kel-F 3700," which is a 1:1 copolymer of vinylidene fluoride and chlorotrifluoroethylene, and "Kynar" which is polyvinylidene fluoride. The membranes were mounted in fuel cells and tested according to the procedure of Example 55. The percent by weight ion exchange polymer employed, the ion exchange capacity of the ion exchange polymer, the equivalent ion exchange capacity of the membrane formed, the thickness of each membrane, and the potential of each fuel cell at a current density of 50 amp/ft.$^2$ is set out in Table V.

Example 68

An ion exchange membrane was formed by the procedure of Example 38. The membrane was formed of a cross-linked sulfonated polymer of perfluorostyrene, "Kynar," which is polyvinylidene fluoride, and "Viton A–HV," which is a 1:1 copolymer of vinylidene fluoride and hexafluoropropylene. The membrane was mounted in a fuel cell and tested according to the procedure of Example 55. The percent by weight ion exchange polymer employed, the ion exchange capacity of the membrane formed, the thickness of the membrane, and the potential of the fuel cell at a current density of 50 amp/ft.$^2$ is set out in Table V.

TABLE V

| Example | 63 | 64 | 65 | 66 | 67 | 68 |
| --- | --- | --- | --- | --- | --- | --- |
| Proportion of Ion Exchange Polymer (weight-percent) | 30 | 30 | 33 | 20 | 50 | 35 |
| Relative Proportions of Inert Polymers: | | | | | | |
| "Kel-F 3700"* | 90 | 85 | 100 | 20 | 10 | |
| "Kynar"* | 10 | 15 | | 80 | 90 | 50 |
| "Viton A-HV"* | | | | | | 50 |
| Ion Exchange Capacity: | | | | | | |
| Ion Exchange Polymer | 2.36 | 2.60 | 2.36 | 4.07 | 2.30 | 2.30 |
| Equivalent | 0.71 | 0.78 | 0.78 | 0.81 | 1.15 | 0.81 |
| Membrane Thickness (inch) | .011 | .013 | .011 | .0135 | .015 | .014 |
| Fuel Cell Potential (volts) | 0.82 | 0.82 | 0.82 | 0.70 | 0.74 | 0.74 |

*Trademark—generic identification in example text.

*Example 69*

A quantity of 5 grams of poly α,β,β-trifluorostyrene having a molecular weight of 125,000 was dissolved in 190 ml. of reagent grade chloroform in a 500 ml. 3-neck flask. The flask was equipped with a mechanical stirrer, stopper, and addition funnel. A mixture was prepared containing 11.1 g. of chlorosulfonic acid and 10 ml. of reagent grade chloroform. This mixture was added over a period of 10 minutes to the polymer solution, with stirring. The temperature during the addition ranged from 23° C. to 27° C. The sulfonated polymer slowly precipitated from the chloroform solution in 7 to 10 minutes and the reaction mixture was decanted from the precipitated polymer over a period of 30 minutes.

The crude, partially-sulfonated polymer was then immersed in 100 ml. of methanol and hydrolyzed by boiling for one hour. The methanol solution was decanted and the methanol evaporated to leave a white solid which was the desired polymer. The polymer was washed with distilled water to remove traces of the mineral acid remaining from the sulfonation and created during the hydrolysis, and dried overnight in an oven set at 105° C. The yield, over a series of runs, ranged from 4.2 to 5.1 g. of polymers having ion exchange capacities in the range of from 1.10 to 1.25 milliequivalents of hydrion per gram of dry resin.

*Example 70*

A solution was prepared containing 230 ml. of reagent grade perchloroethylene and 6 g. of α,β,β-trifluorostyrene, having a molecular weight of about 200,000, in a 1,000 ml. 3-neck flask equipped with a mechanical stirrer, stopper, and addition funnel. A mixture is prepared containing 20 g. of chlorosulfonic acid and 20 ml. of perchloroethylene. This mixture was added over a period of 10 to 15 minutes to the stirred polymer solution, the temperature remaining at 25±2° C. The sulfonated polymer precipitated from the perchloroethylene solution and the reaction mixture was decanted from the precipitated polymer over a period of 30 minutes.

The partially-sulfonated poly α,β,β-trifluorostyrene is then immersed in about 150 ml. of methanol where it dissolved, and a hydrolysis was conducted by boiling for one hour. The methanol solution is decanted and the methanol was evaporated to leave a white solid of the desired material. The polymer was then washed with distilled water to remove traces of the mineral acid remaining from the sulfonation and created during the hydrolysis, and dried overnight at 105° C. The ion exchange capacity of the polymer ranged over a series of runs from 1.3 to 1.5.

*Example 71*

A butanol-methanol mixture was prepared in a 50/50 ratio in a total amount of 200-300 ml. To this was added 15 g. of partially sulfonated poly α,β,β-trifluorostyrene and a film of the solution was laid down on a polyethylene trephthalate sheeting, such as that marketed under the trademark "Mylar." The alcohol mixture was evaporated and a quantity of triethylphosphate, equal to from 1 to 3 percent of the weight of polymer, was sprayed onto the film. The film was then covered with another polyethylene terephthalate sheet. The sheet laminate was placed inside a shim which is 8 inches on each side and 0.006 inch thick. The shim and laminate were placed between two ¼-inch aluminum plates and pressed at 275° F. at a pressure of 4,000 p.s.i. After cooling, the membrane was removed from the sheeting and found to be quite flexible due to the incorporation of the triethylphosphate plasticizer. A series of runs produced membranes having an area of 64 square inches and an average thickness of 0.009 inch.

*Example 72*

A membrane, prepared as in Example 71, was soaked in water for 5 minutes and then cut to fit an electrode formed of platinum black and 10 percent, by weight, "Teflon" of the type disclosed in commonly assigned application Ser. No. 232,689. The membrane was sandwiched between two of these electrodes, a polyethylene terephthalate sheet placed on each side of the assembly and the entire structure placed between 8-inch aluminum plates. The electrodes were pressed into the membrane at a pressure of 2,000 p.s.i. at a temperature of 250° F. After cooling, the aluminum plates and the polyethylene terephthalate sheeting were removed from the cell. The membrane-electrode structure was immersed in distilled water for 2 days to remove the triethylphosphate plasticizer used for fabrication and electrode joining. The membrane-electrode assembly was then placed in a fuel cell structure such as shown in the drawing. Pure hydrogen gas was fed to one of the electrodes and pure oxygen to the other. A recording voltmeter and ammeter were placed in a circuit connecting the two electrodes and registered 0.75 volt at 2.25 amp.

The cell was run continuously for a period of 500 hours while being supplied by hydrogen gas at the anode and oxygen gas at the cathode. A constant current density of 50 amp./ft.$^2$ was maintained at the membrane by fixing the resistance of the external circuit. During the entire 500-hour period, the cell measured a nearly constant 0.75 volt.

The properties described for the sulfonated polytrifluorostyrene polymer make it extremely advantageous for a variety of uses. Its high density, chemical stability, and thermal stability allow the formation and operation of fuel cells under conditions not previously attainable. In addition, these properties provide for the profitable employment of such a material as a barrier membrane in electrodialysis cell. Such a structure would consist of an anode compartment having an electrode, a cathode compartment having an electrode, and a barrier separating the compartments. The barrier would be composed of materials disclosed above as useful for ion exchange membranes.

While we have shown and described specific embodiments of our invention, we do not desire to be limited to the particular formulas and apparatus shown and described. We intend, by the appended claims to cover all modifications within the spirit and scope of our invention.

What we claim as new and desire to secure by Letters Patent of the United States is:

1. An ion exchange polymer consisting of a sulfonated polymer of α,β,β-trifluorostyrene.

2. An ion exchange polymer according to claim 1 in which the sulfonated polymer of α,β,β-trifluorostyrene is linear.

3. An ion exchange polymer according to claim 2 in which the sulfonated polymer of α,β,β-trifluorostyrene has a molecular weight in the range of from 13,500 to 400,000.

4. An ion exchange polymer according to claim 1 in which the sulfonated polymer of α,β,β-trifluorostyrene is cross-linked and is insoluble and infusible.

5. An ion exchange polymer consisting of a sulfonated polymer of α,β,β-trifluorostyrene, the sulfonic acid radicals being meta to the trifluoroethyl group.

6. An ion exchange structure having an equivalent ion exchange capacity in the range of from 0.5 to 4.10 comprised of
   a sulfonated polymer of $\alpha,\beta,\beta$-trifluorostyrene, and
   water in a proportion of from 10 to 48 percent, by weight, based on the total weight of the ion exchange structure.

7. An ion exchange membrane having an equivalent ion exchange capacity in the range of from 0.5 to 4.10 comprised of
   a sulfonated polymer of $\alpha,\beta,\beta$-trifluorostyrene, and
   water in a proportion of from 10 to 48 percent, by weight, based on the total weight of the ion exchange membrane.

8. An ion exchange membrane according to claim 7 in which the sulfonated polymer of $\alpha,\beta,\beta$-trifluorostyrene is linear.

9. An ion exchange membrane according to claim 8 in which the sulfonated polymer of $\alpha,\beta,\beta$-trifluorostyrene has a molecular weight in the range of from 13,500 to 400,000.

10. An ion exchange polymer according to claim 7 in which the sulfonated polymer of $\alpha,\beta,\beta$-trifluorostyrene is cross-linked and is insoluble and infusible.

11. An ion exchange membrane having an equivalent ion exchange capacity in the range of from 0.5 to 1.80 comprised of
    a linear, sulfonated polymer of $\alpha,\beta,\beta$-trifluorostyrene, and
    water in a proportion of from 10 to 48 percent, by weight, based on the total weight of the ion exchange membrane.

12. An ion exchange structure having a hydrogen ion resistivity in the range of from 20 to 250 ohm-cm., comprised of
    a sulfonated polymer of $\alpha,\beta,\beta$-trifluorostyrene, inert solids, and
    water in a proportion of from 10 to 48 percent, by weight, based on the total weight of the ion exchange membrane.

13. An ion exchange membrane having a hydrogen ion resistivity in the range of from 20 to 250 ohm-cm., comprised of
    a sulfonated polymer of $\alpha,\beta,\beta$-trifluorostyrene, vinyl polymer, and
    water in a proportion of from 10 to 48 percent, by weight, based on the total weight of the ion exchange membrane.

14. An ion exchange membrane according to claim 13 in which the vinyl polymer is a halocarbon polymer.

15. An ion exchange membrane according to claim 14 in which the halocarbon polymer is a fluorocarbon polymer.

16. An ion exchange membrane according to claim 15 in which the fluorocarbon polymer is polyvinylidene fluoride.

17. An ion exchange membrane according to claim 15 in which the fluorocarbon polymer is a copolymer of vinylidene fluoride and chlorotrifluoroethylene.

18. An ion exhange membrane according to claim 15 in which the fluorocarbon polymer is polychlorotrifluoroethylene.

19. An ion exchange membrane according to claim 15 in which the fluorocarbon polymer is a copolymer of polytetrafluoroethylene and hexafluoropropylene.

20. An ion exchange membrane according to claim 15 in which the fluorocarbon polymer is a copolymer of vinylidene fluoride and hexafluoropropylene.

21. An ion exchange membrane according to claim 14 in which the halocarbon polymer is polyvinyl chloride.

22. An ion exchange membrane according to claim 14 in which the halocarbon polymer is polyvinylidene chloride.

23. An ion exchange membrane according to claim 13 in which the vinyl polymer is polyethylene.

24. An ion exchange membrane according to claim 13 in which the vinyl polymer is a copolymer of styrene and butadiene.

25. An ion exchange membrane according to claim 13 in which the vinyl polymer is neoprene.

26. An ion exchange membrane according to claim 13 in which the vinyl polymer is chlorosulfonated polyethylene.

27. A fuel cell comprising
    an ion exchange membrane having opposed faces and having an equivalent ion exchange capacity in the range of from 0.5 to 4.10 comprised of a sulfonated polymer of $\alpha,\beta,\beta$-trifluorostyrene and water in a proportion of from 10 to 48 percent, by weight, based on the total weight of the membrane,
    first and second electrodes mounted adjacent the opposed faces of the ion exchange membrane, and
    means supplying a fuel to said first electrode and an oxidant to said second electrode.

28. A fuel cell comprising
    an ion exchange membrane having opposed faces and having an equivalent ion exchange capacity in the range of from 0.5 to 1.80 comprised of a linear, sulfonated polymer of $\alpha,\beta,\beta$-trifluorostyrene and water in a proportion of from 10 to 48 percent, by weight, based on the total weight of the membrane,
    first and second electrodes mounted adjacent the opposed faces of the ion exchange membrane, and
    means supplying a fuel to said first electrode and an oxidant to said second electrode.

References Cited

UNITED STATES PATENTS

| | | | |
|---|---|---|---|
| 2,631,127 | 3/1953 | D'Alelio | 260—2.2 |
| 2,913,511 | 11/1959 | Grubb | 136—86 |
| 3,041,317 | 6/1962 | Gibbs et al. | 260—2.2 |
| 3,207,708 | 9/1965 | Oster et al. | 136—153 |
| 3,253,956 | 5/1966 | Vielstich et al. | 136—86 |

WINSTON A. DOUGLAS, Primary Examiner.

D. L. WALTON, Assistant Examiner.